United States Patent [19]

Montiero

[11] Patent Number: 4,524,511
[45] Date of Patent: * Jun. 25, 1985

[54] ADJUSTABLE INTERIOR PIPE CUTTER

[75] Inventor: Richard Montiero, Lake Worth, Fla.

[73] Assignee: Remcut International Inc., Fort Lee, N.J.

[*] Notice: The portion of the term of this patent subsequent to Aug. 21, 2001 has been disclaimed.

[21] Appl. No.: 631,994

[22] Filed: Jul. 18, 1984

Related U.S. Application Data

[63] Continuation of Ser. No. 470,057, Feb. 28, 1983, Pat. No. 4,466,185.

[51] Int. Cl.³ .............................................. B23D 21/14
[52] U.S. Cl. ......................................... 30/108; 82/82
[58] Field of Search ................. 30/103, 104, 105, 106, 30/107, 108; 82/4 C, 82, 83

[56] References Cited

U.S. PATENT DOCUMENTS

| 412,944 | 10/1889 | Benade | 30/108 |
|---|---|---|---|
| 514,985 | 2/1894 | Fox | 30/108 |
| 643,961 | 2/1900 | Hanten et al. | 30/108 |
| 667,857 | 2/1901 | Wathier | 30/105 |
| 2,814,105 | 11/1957 | Smith | 30/105 |
| 3,196,722 | 7/1965 | Lewis | 30/106 X |
| 3,355,972 | 12/1967 | Janik | 82/82 |
| 3,883,950 | 5/1975 | Kurtz | 30/106 |
| 4,466,185 | 8/1984 | Montiero | 30/103 |

Primary Examiner—Jimmy C. Peters
Attorney, Agent, or Firm—Kane, Dalsimer, Kane, Sullivan and Kurucz

[57] ABSTRACT

A pipe cutter is provided whereby a pipe or workpiece is cut from the inside out said cut accomplished by rotating cutters that are mounted on the ends of pivoted sliding guides wherein the guides are pivoted at the end opposite to that of the cutters and the pivoting action expands the end of the guides wherein the cutters are attached and by driving the pivoted sliding guides by a rotating motion the inside wall of the workpiece will be cut.

2 Claims, 8 Drawing Figures

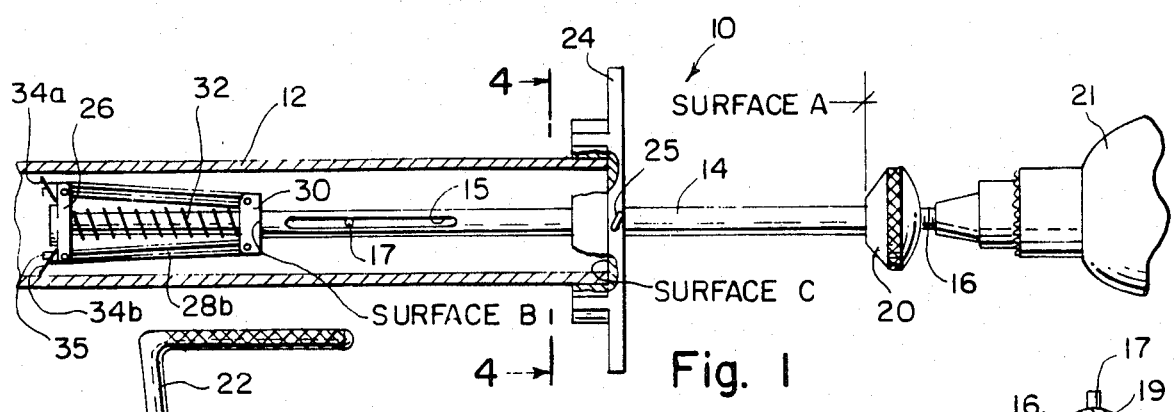
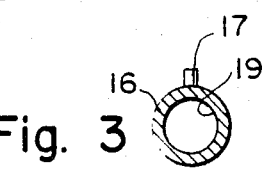
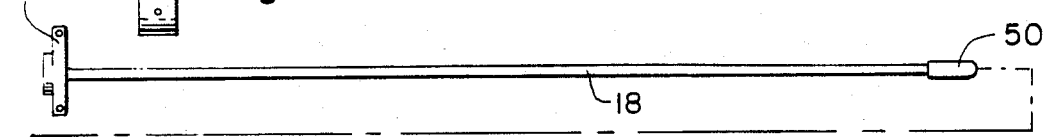
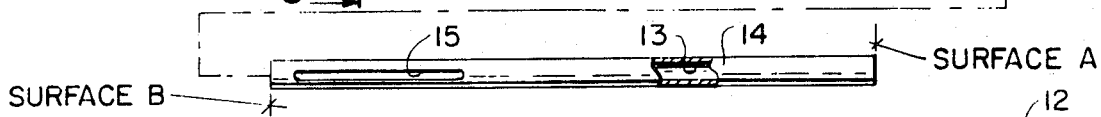
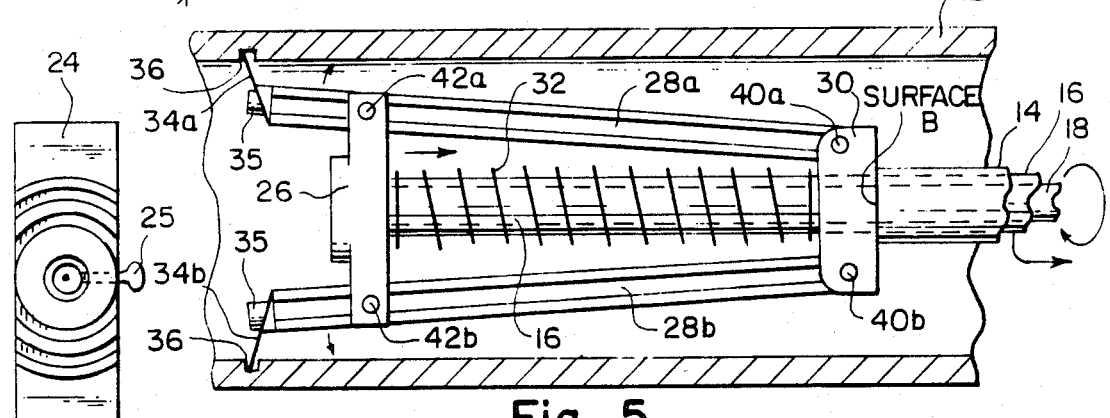
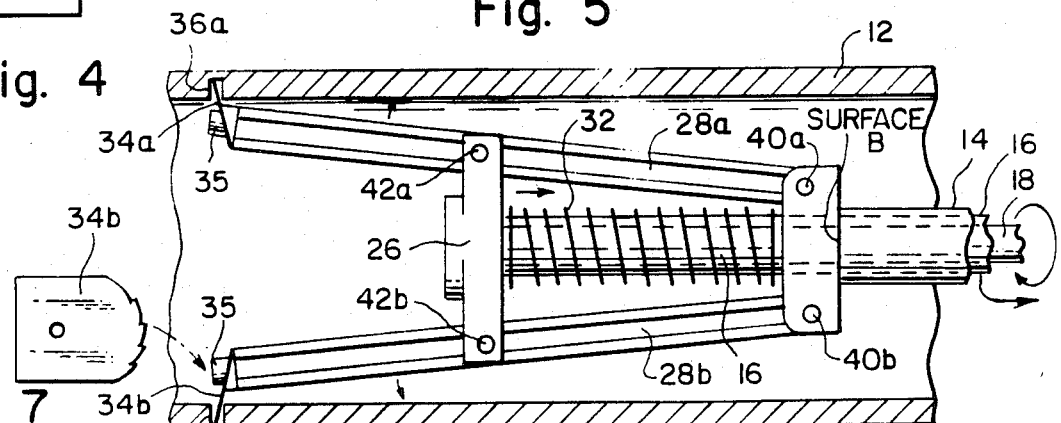

ADJUSTABLE INTERIOR PIPE CUTTER

This is a continuation of application Ser. No. 470,057, filed Feb. 28, 1983, now U.S. Pat. No. 4,466,185, issued Aug. 21, 1984.

BACKGROUND OF THE INVENTION

1. Field of the Invention

The instant invention relates to a pipe cutter which is used to cut off desired lengths of pipes and specifically said invention relates to a pipe cutter that cuts from the inside of the pipe in an outward direction.

2. Description of the Prior Art

The prior art is exemplified by many examples of pipe cutters all of which initially cut the outside of the pipe and cut from the outside to inside.

Additionally when cutting off predetermined lengths of pipe a separate measurement needs to be made.

However the disadvantages of the prior art are overcome by the present invention.

Accordingly it is an object of the instant invention to provide an internal pipe cutter so that access to the external area of the pipe is not required which proves exceedingly useful when the outside of a pipe is inassessable as for example when a pipe below a fixed surface and cannot be reached by a hacksaw or any other means. This condition is especially present in the construction of homes that are built on concrete slabs and often times an installed pipe needs to be cut below the level of the floor and to date there are no devices to do this without exposing the outside of the pipe that needs to be cut.

SUMMARY OF THE INVENTION

In the present invention the disadvantages of the prior art are overcome by provding a pipe cutter that cuts from the inside to the outside while providing a built in depth guide.

A rotating drive shaft is provided and is powered by electric such as an electric drill or may be powered by a hand crank. Attached to the non-powered end of said rotating drive shaft is a driving sliding member that imparts its rotation to a pair of pivoted slotted guides. On one end of each of said slotted guides is a cutter with the cutting edges of said cutters perpendicular to the axis of the pipe to be cut.

The pivoted slotted guides are expanded by a draw bar moving the driving slide member in the slots of the slotted guide while at the same time said cutters rotate in order that the cutters cut into the wall of the pipe that is being cut.

Accordingly it is an object of the instant invention to provide a pipe cutter that cuts pipe from the inside surface so that access to the external wall of the pipe is unnecessary.

DESCRIPTION OF THE DRAWING

FIG. 1 of the drawing is a cross sectional view of the invention in actual use on the workpiece.

FIG. 2 of the drawing is a partial exploded view of the invention.

FIG. 3 of the drawing is a sectional view of the draw bar.

FIG. 4 of the drawing is a view of the depth and centering device.

FIG. 5 of the drawing is a cross sectional view of the cutting area of the invention wherein a cut in the workpiece is in progress.

FIG. 6 of the drawing is a cross sectional view of the cutting area of the invention wherein a cut in the workpiece has progressed and is approximately seventy five percent completed.

FIG. 7 of the drawing is an end view of the cutting means.

FIG. 8 of the drawing is a perspective view of a hand crank used as an optional power source.

DESCRIPTION OF THE PREFERRED EMBODIMENTS

Turning now descriptively to the wherein like reference numbers refer to like elements throughout the several view of the drawing, the instant invention is generally shown in FIG. 1 as 10.

Workpiece 12 is pipe which is to be cut in the area of 36 and 36a (as best seen in FIGS. 5 and 6) said workpiece being typical plumbing pipe such as PCV but may also be used on any other materials such as copper, iron, brass, steel and alike.

As shown in the drawing the instant invention is inserted into the inside of workpiece 12. Surface C of depth and centering device 24 is butted against the open end of workpiece 12 and set screw 25 is tightened down onto spacer bar 14 when cutters 34a and 34b are located at the desired position where the workpiece is to be cut. Depth and centering device 24 has concentric grooves on one face so that the workpiece will be retained and centered on said concentric grooves.

Cutting the workpiece is accomplished by moving two pivoted sliding guides 28a and 28b in an outward direction so that the two cutters, 34a and 34b that are positioned on the ends of said pivoted sliding guides contact the inside of the workpiece and as said two pivoted sliding guides are rotated they are continually expanded and thus the cutters cut into and eventually cut through the wall of the workpiece.

A first pivoted slide guide 28a and a second pivoted slide guide 28b are pivoted at 40a and 40b to guide pivot post 30 said guide pivot post 30 having an aperture so that it freely slides on the outside of draw bar 16.

Driving sliding member 26 is firmly attached to one end of drive shaft 18 so that when a force is applied to the opposite end of drive shaft 18 at 50 by means of electrical power 21 or hand crank 22 said driving sliding member 26 imparts a rotating force on pivoted sliding guides 28a and 28b and since cutters are attached to said pivoted sliding guides said cutters are thus powered.

Driving slide member 26 is also rotatably attached to the unthreaded end of draw bar 16 so that it may be moved towards the power source which will cause pivoting sliding guides 28a and 28b to pivot about 40a and 40b respectively in guide pivot post 30 with the result that the cutters 34a and 34b that are attached to the ends of pivoting sliding guides 28a and 28b expand and cut the workpiece, said expansion due to the straight line distance between drive slide pin 42a and 42b being greater than the straight line distance between pivot points 40a and 40b, said distance variation causing pivoting sliding guides 28a and 28b to move in an outward direction as driving slide member 26 approaches guide pivot post 30.

Cutter advance 20 is provided having a threaded internal aperture so that when rotate on externally threaded draw bar 16, said cutter advance 20 and spacer bar 14 will butt up against one another at surface A and continued rotation by the operator of cutter advance 20 will draw back draw bar 16 which in turn will draw back driving slide member 26 (as driving slide member 26 is rotatably connected to draw bar 16) and cause the cutters 34a and 34b to move in an outward direction to cut the wall of the workpiece.

A slotted aperture 15 is provided in spacer bar 14 so that pin 17 in draw bar 16 may ride freely in said slotted aperture so that the entire tool stays in a single unit if cutter advance 20 is disassembled from the tool.

Spring 32 is provided to return the cutters to the closed position so that no gap exists at surface B. Additionally screws 35 are provided so that cutters 34a and 34b may be easily changed either due to wear or for different type of workpiece wherein different types of cutters may be needed.

Draw bar 16 has aperture 19 so that drive shaft 18 may be inserted and rotated in and similarly spacer bar 14 has aperture 13 so that it will slide over the outside of draw bar 16.

While certain novel features of this invention have been shown and described and are pointed out in the annexed claims, it will be understood that various omissions substitutions and changes in the forms and details of the device illustrated and in its operation can be made by those skilled in the art without departing from the spirit of the invention.

Having regard to the foregoing disclosure the following is claimed as the inventive and patentable embodiments thereof:

1. A pipe cutter for cutting pipe from the inside out which comprises:
   (a) two pivoted sliding guides having guides;
   (b) a guide pivot post wherein a first end of two pivoted sliding guides are pivoted mounted;
   (c) a cutter for cutting the inside of the pipe fixed to the end of each pivoted sliding guide and being generally perpendicular to the pipe to be cut;
   (d) a driving slide member that slides within the guides of the pivoted sliding guide and imparts to the pivoted sliding guides a rotational force so that the cutters will have the necessary force to cut into the pipe;
   (e) a drive shaft that has a first end firmly attached to said driving slide member and a second end whereby a driving force may be exerted;
   (f) a draw bar that has an aperture through its center whereby said drive shaft is inserted, said draw bar rotatably attached to said driving slide member;
   (g) a spacer bar having an aperture through its center whereby said spacer bar is inserted over said draw bar.

2. A pipe cutter for cutting pipe from the inside out as recited in claim 1, further comprising a depth and centering device with concentric grooves on one face so as the pipe being cut will be located in said grooves, said depth and centering device having an aperture so that it will slide over the outside of said spacer bar and with means to firmly retain said depth and centering device to the outside of said spacer bar.

* * * * *